United States Patent
Smith

(10) Patent No.: US 7,023,976 B1
(45) Date of Patent: Apr. 4, 2006

(54) METHOD AND SYSTEM FOR ON-DEMAND CALL WAITING

(75) Inventor: Donald E. Smith, Lexington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 399 days.

(21) Appl. No.: 10/228,543

(22) Filed: Aug. 26, 2002

(51) Int. Cl.
H04M 3/42 (2006.01)

(52) U.S. Cl. .............................. 379/215.01; 379/142.08

(58) Field of Classification Search ........... 379/215.01, 379/88.19, 142.08, 88.2, 88.21, 207.15, 211.01, 379/211.02, 212.01, 142.01, 142.04, 142.06, 379/210.02
See application file for complete search history.

(56) References Cited

U.S. PATENT DOCUMENTS 6,611,684 B1 * 8/2003 Franks ....................... 455/433
6,697,479 B1 * 2/2004 Barnes et al. .......... 379/215.01
2002/0076026 A1 * 6/2002 Batten

OTHER PUBLICATIONS

RCN—Phone Privacy, http://www.rcn.com/phone features/privacy/main_privacy.html, Jun. 3, 2002, 3 pages.

* cited by examiner

Primary Examiner—William J. Deane, Jr.
(74) Attorney, Agent, or Firm—Leonard C. Suchyta, Esq.; Joel Wall, Esq.

(57) ABSTRACT

A method is provided for enabling a customer to activate a call waiting feature for a list of caller numbers specified by the user. Calls from numbers on the list generate call waiting tones if they call while the customer is talking to someone. Other callers will hear a busy signal or may be routed to voicemail. The customer can activate the feature and add numbers to, or can remove numbers from, the list by entering one or more codes and interacting with prompts from a network server to enter the numbers to be added or deleted. A method for administering the feature on the network can include administering user charges for activating and maintaining the feature and deleting a number from the list when the user receives a call from the number.

15 Claims, 2 Drawing Sheets

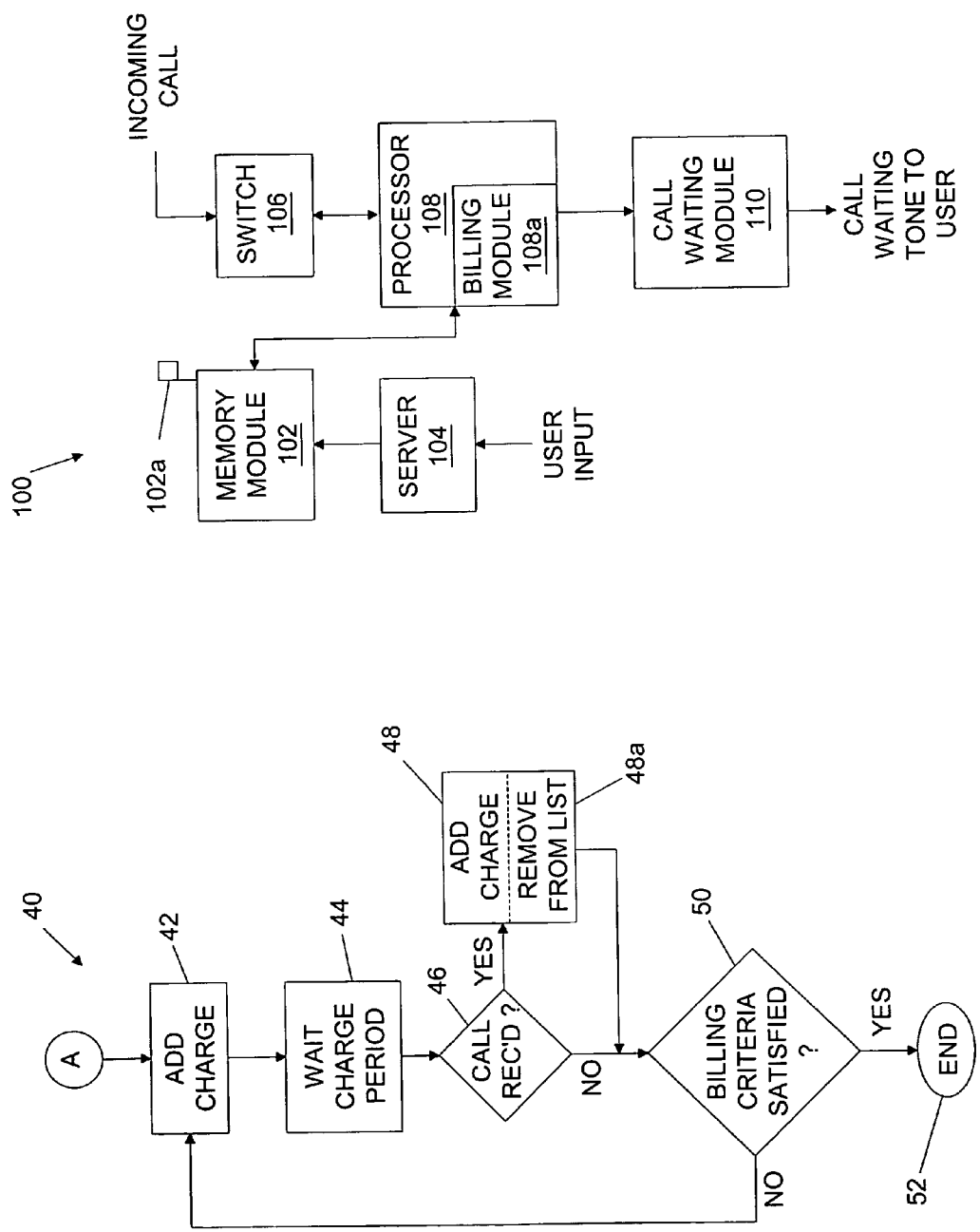

METHOD AND SYSTEM FOR ON-DEMAND CALL WAITING

RELATED APPLICATIONS

There are no related applications.

FIELD OF THE INVENTION

The methods and systems relate to communication networks, and more particularly to administering a call waiting feature of a communications network.

BACKGROUND

Call waiting is a known feature that may be provided on many communications networks for a monthly fee. When a network user is on a call, a tone can be provided to the user to denote another incoming call. The user can respond by pressing a button on the phone, which can place the first call on hold and answer the incoming call. Depressing the button again can return the user to the first call.

For calls the user may not want to have interrupted, such as during a call using a modem connection, the user can dial a code before dialing the number to be called. The call waiting feature will be deactivated for the current call only. The call waiting feature can automatically reactivate once the current call is completed and the user hangs up. The call waiting feature may be combined with a caller identification feature, such that caller information can be displayed to the user. The user may then decide whether to accept the second call or not.

Other features that can allow a user to control incoming calls include a call acceptance feature and a call blocking feature. With the call acceptance feature, the user can input a listing of telephone numbers from which incoming calls will be allowed. Incoming calls from other numbers may not get through to the user, i.e., there will be no indication to the user that an incoming call was effectively blocked. With the call blocking feature, the user can block certain classes of telephone numbers from which incoming calls will not be allowed. The classes may include numbers that have no associated caller identification, or that are identified as "anonymous" or "out-of-area". Additionally, the user may input a listing of telephone numbers from which incoming calls will not be allowed. Incoming calls from other numbers may get through to the user as normal. Numbers can be added or deleted from the acceptance or blocked numbers lists by dialing a code. The call blocking feature can be activated for a number after completing a call to or from that number.

The communications network may normally charge the user monthly fees for the features described above, or, in the case of the blocked numbers list used independently from the general call blocking feature, a daily fee may be charged until the user deactivates each number on the blocked numbers list.

SUMMARY OF THE INVENTION

A method and system for enabling an on-demand call waiting feature on a communication network may include providing a listing of numbers for which the feature is to be activated and providing a call waiting tone to a user when a call is received from one of the numbers of the listing and the user is on a call. Numbers can be added or removed from the listing by initiating an access code, inputting a number in response to prompts from the network, adding the input number to the listing when an add number code is provided by the user, removing the input number from the listing when a remove number code is provided by the user and returning to inputting when an additional number is to be input.

The method and system may also include administering charges to the user for the feature by adding a charge to a user account when the feature may have been enabled, when a predetermined number of calls may have been received from numbers on the listing, and/or when the feature may have been enabled for a specified time period. The feature may be deactivated when a billing criteria may have been met. The billing criteria may include having the feature deactivated by the user, having no numbers in the listing and/or having the feature implemented for a specified time. The method and system can remove numbers from the listing for which calls have been received and may also add charges to the user account for numbers remaining on the listing.

The system for implementing the on-demand call waiting feature on a network can include a memory for storing the listing, a switch receiving an incoming call, a processor comparing the incoming call to the listing stored in the memory and a call waiting device to activate a tone when the processor determines a match between the incoming call and the listing. The system can also include a server to provide the prompts to the user and a billing module to implement charging the user when the on-demand call waiting feature is implemented.

A computer-readable medium may contain instructions for controlling a network system to implement the on-demand call waiting feature, by controlling the network to prompt a user of the network to input a number in response to the user inputting an access code, to add the input number to a listing of numbers for which the feature is to be enabled when the access code is an add number code, to remove the input number from the listing when the access code is a remove number code, to return to prompting the user when the input number is not a last input number and to provide a call waiting tone to the user when a call is received from a number on the listing and the user is on a call. The instructions may also control the network system to add a charge to the user account when a predetermined number of calls from numbers on the listing may have been received and/or when the feature may have been implemented for a specified time period. The instruction may control the network system to deactivate the feature when the user may have deactivated the feature, when no numbers remain in the listing and when the feature may have been implemented for a specified time.

BRIEF DESCRIPTION OF THE DRAWINGS

The following figures depict certain illustrative embodiments in which like reference numerals refer to like elements. These depicted embodiments are to be understood as illustrative and not as limiting in any way.

FIG. 4 shows an illustrative flow chart for administering the on-demand call waiting feature; and FIG. 5 shows an illustrative system for implementing the call waiting feature.

DETAILED DESCRIPTION OF CERTAIN ILLUSTRATED EMBODIMENTS

Figure 1:
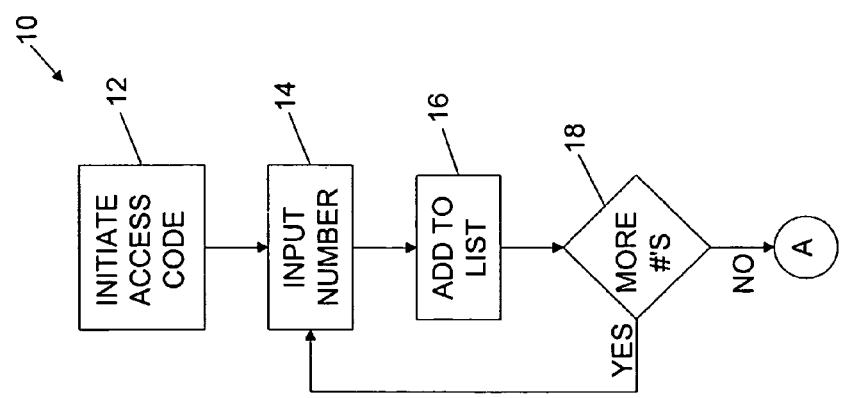
FIG. 1 shows an illustrative flow chart for providing a list of numbers for which a call waiting feature will be activated.

Referring now to FIG. 1, an activation sequence 10 may be shown by which a user may input a list of one or more numbers into a communications network. The user may dial an access code (12) recognized by the network that connects the call with a network server, such as a voice webserver, that can play prompts, collect dual tone multi-frequency (DTMF) tones, recognize speech, or do text-to-speech (TTS) script. Such servers may be known in the art and can be used extensively for routing incoming calls (such as having the caller choose an extension), obtaining information from the caller (such as providing account number information), or the like.

For the on-demand call waiting feature, the user can input a number (14) as prompted by the server. As may be standard with such servers, the number may be repeated to the user to verify the correctness of the input. The number can be added (16) to a listing maintained within the network of on-demand call waiting numbers associated with the user number. The user may then be prompted, or asked to add more numbers (18). The user may end the activation sequence 10 when the desired numbers have been entered, as indicated at "A".

The listing may operate within the network such that the network can provide a tone to the user when another incoming call may be received from a number on the on-demand call waiting list. Incoming callers from numbers not on the list may receive a busy signal when the user may be already on a call, or may be routed to the user's voice mail, or otherwise routed in a manner consistent with the network methods for handling such calls. The network can provide such listings and management of calls using known functionalities as may be used for such features as selective call acceptance features and call waiting features. In using the functionality of a selective call acceptance feature, the network can route incoming calls from numbers on the call waiting listing to a call waiting switch. Using the functionality of a call waiting feature, the network can provide a tone to the user to denote another incoming call when the user may be already on a call.

Figure 2:
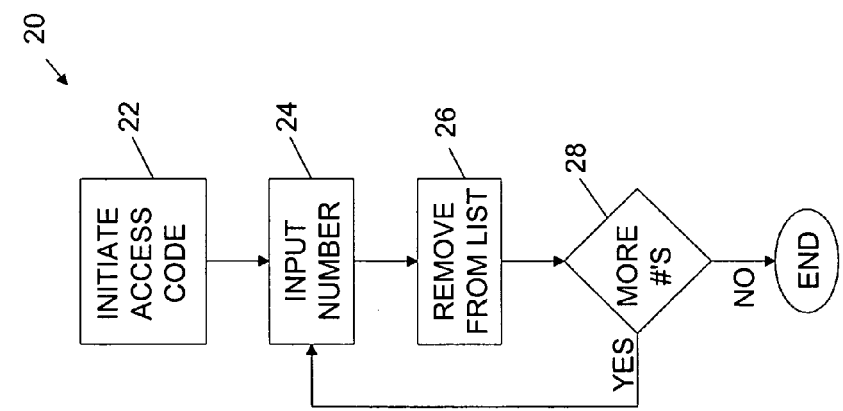
FIG. 2 shows an illustrative flow chart for removing numbers from the list of FIG. 1.

Referring to FIG. 2, a similar process can be followed when the user wishes to deactivate the on-demand call waiting feature for one or more numbers. Number deactivation sequence 20 may include dialing an access code (22) and interfacing with a server to input a number (24) that may then be removed from the listing (26) of on-demand call waiting numbers maintained for the user. Once it can be determined that no more numbers are to be input (28) the user can end the deactivation sequence 20. Deactivation sequence 20 may include prompting and number verification, as described for activation sequence 10.

Figure 3:
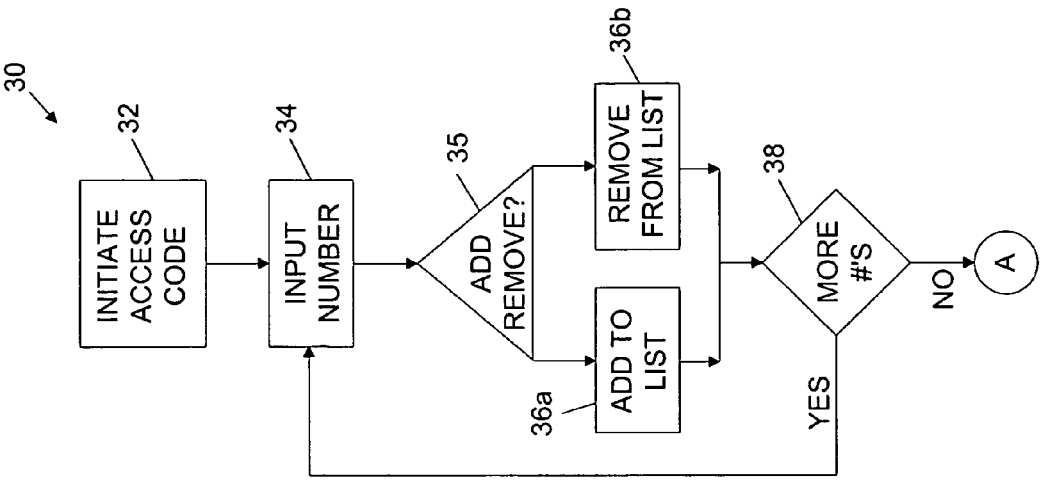
FIG. 3 shows an illustrative flow chart for adding or removing numbers from the list.

It can be seen from FIGS. 1 and 2 that the initiation sequence 10 and deactivation sequence 20 may have corresponding actions, which may be combined as shown in FIG. 3. In the embodiment of FIG. 3, a combined activation/deactivation sequence 30 may be shown. The user may initiate an access code (32) and input a number (34) in response to prompts from the server. The sequence 30 can then determine (35) if the number can be added to the list (36a) or removed from the list (36b). The determination may be based on the access code, or on a response to a prompt from the server requesting the user to indicate whether the input number may be added or removed. As in sequences 10 and 20, the user may then be prompted, or asked to add more numbers (38). The user may end the activation/deactivation sequence 30 when the desired numbers have been entered, as indicated at "A".

Referring now to FIG. 4, there may be shown an embodiment of a method 40 for administering the on-demand call waiting service. Once the user may have performed the activation sequence, either sequence 10 or sequence 30, as shown at "A" in FIGS. 1 and 4, an activation charge can be added (42) to the user's network account, or billing statement. In the embodiment of FIG. 4, the user may be charged for increments of time, or charge periods, during which the on-demand call waiting feature may be activated. For example, charges may be added on a daily, weekly or monthly basis. The method 40 may utilize a clock or counter, or other such means, to time the charge period as shown at 44.

In the embodiment of FIG. 4, the user may additionally be charged when a call can be received from a number on the call waiting list. Method 40 can determine the number of calls received during the charge period (46) by matching call records maintained by the network to the call waiting list. When the number of calls can be determined, the appropriate call charge may be added (48) to the user's account. The call charge may be a charge per call received charge, may be a charge for a group of calls, or may be a charge per number on the call waiting list for which at least one call was received. In one embodiment, a number may be removed from the listing when a call (or a specified number of calls) may have been received from the number. In this embodiment, the number may be removed from the listing when the charge can be added, as may be indicated at 48a. In one embodiment, the determination of calls received (46) may monitor call activity, such that charges may be added to the user's account as calls from numbers on the listing may be received.

The method 40 may then determine (50) if the billing criteria has been met. The user may be given a choice of various alternative billing options when the user may initiate the feature. For example, the user may request that the feature be maintained until expressly deactivated, whether or not the call waiting list may contain a number. Such may be the case when a user may be willing to pay for the availability of the feature, even though the feature may not be in use. In this case, method 40 may determine (50) the activation status of the feature and method 40 can be repeated if the feature may not have been deactivated, or method 40 may end (52) when the feature may have been deactivated. It can be noted that ending method 40 may include deleting the call waiting list, or the list may be saved for future activation of the feature.

For a billing option where the feature may be deactivated when no numbers remain on the list, method 40 may determine (50) whether there are numbers remaining on the call waiting list. If numbers remain on the call waiting list, method 40 can be repeated such that a new charge may be added the user account. If no numbers remain on the listing, method 40 can end at 52. Optionally, under this billing criteria, calls may be removed as at 48a with or without adding charges.

For a billing option where the feature may be maintained for only a specified period of time, which may or may not coincide with the charge period, method 40 can determine (50) if the specified period of time may have expired. The specified time period may be input by the user, or may be set by the network. Method 40 may then repeat if the specified period of time may not have expired, or may end at 52 if the specified time period may have expired. As in the billing option where express deactivation may be required, ending method 40 may, or may not include deleting the call waiting list.

It can be appreciated that various combinations of the above billing options, or other forms of charges or billing options may be applicable to the on-demand call waiting feature described herein. As an example, the user may be charged for each number maintained on the listing, or combinations of the above billing options may be implemented. Other charges, including one time activation fees, or activation fees per number activated, may also be added to the user account. It may also be appreciated that charges may be added (42), or the determination of calls received (46) may be made, before, after, or during the charge period.

FIG. 5 illustrates a system 100, or network, that can implement the on-demand call waiting feature described above. A memory module 102 can contain the listing of numbers for which the call waiting tone will be provided. The listing may be input to, or may otherwise be edited at, memory module 102 through server 104, as described in relation to the activation and deactivation sequences 10, 20, 30. When an incoming call can be received and the user may not be on a call, switch 106 can handle the call in a standard manner for the network 100. If the user may be already on a call, switch 106 can check if the on-demand call waiting feature may be activated, e.g., by determining if memory 102 contains a listing, such as by flag 102*a*. If on-demand call waiting may be activated, processor 108 can compare the calling number with the listing in memory module 102. If the calling number may be on the listing, processor module 108 can route the call to call waiting module 110.

Call waiting module 110 can operate in the manner of known call waiting devices on network 100 to provide a call waiting tone to the user. If the calling number may not be on the listing, processor 108 can route the call back to switch 106, which can operate in the standard manner for the network to handle incoming calls. It can be seen that administering method 40 can be implemented in processor 108, e.g., in a billing module 108*a*. Depending on the user selected alternative, if a call can be matched to the listing, the matched call number in memory 102 can be tagged by processor 108 for removal by billing module 108*a*, or alternatively, processor 108 can remove the number from the listing when the match can be found.

The methods and systems described herein are not limited to a particular hardware or software configuration, and may find applicability in many computing or processing environments used by communication networks. The methods can be implemented in hardware or software, or a combination of hardware and software. The methods can be implemented in one or more computer programs executing on one or more programmable computers that include a processor, a storage medium readable by the processor (including volatile and non-volatile memory and/or storage elements, such as memory module 102), one or more input devices, and one or more output devices. In one embodiment, the methods may be implemented on a computer in a network, such as processor 108, or the computer may be a softswitch or a server in a phone network, such as switch 106 and server 104. User control for the systems and methods may be provided through a telephone user interface that may be incorporated with an Internet Service Provider user interface.

The computer program, or programs, may be preferably implemented using one or more high level procedural or object-oriented programming languages to communicate with a computer system; however, the program(s) can be implemented in assembly or machine language, if desired. The language can be compiled or interpreted.

The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The method and system can also be considered to be implemented as a computer-readable storage medium, configured with a computer program, where the storage medium so configured causes a computer to operate in a specific and predefined manner.

While the method and system has been disclosed in connection with the preferred embodiments shown and described in detail, various modifications and improvements thereon will become readily apparent to those skilled in the art. Those with ordinary skill in the art will recognize that the arrangement of the items shown in FIGS. 1–5 are merely for illustrative purposes, and can be varied accordingly items may be combined, expanded, or otherwise reconfigured without departing from the scope of the disclosed methods. As an example, the activation, deactivation and administering sequences may be considered as sub-sequences within an on-demand call waiting sequence, with appropriate branching between the sub-sequences. In a further example, the method 40 may be expanded, or reconfigured, to implement the alternative embodiments previously described, e.g., by incorporating additional charging alternatives at 42, or by removal of per call charges as at 46, 48, 48*a*.

The aforementioned changes are also merely illustrative and not exhaustive, and other changes can be implemented without affecting the ability of the network to provide an on-demand call waiting feature for a user. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method for enabling an on-demand call waiting feature on a communication network, comprising:
  providing a listing of at least one number for which the feature is to be enabled;
  providing a call waiting tone to a user when a call is received from a number on the listing and the user is on a call and;
  upon the user receiving the call, automatically removing from the listing the number from which the call was received.

2. The method of claim 1, wherein providing a listing comprises:
  initiating an access code;
  inputting a number to be added to the listing in response to prompts from the network;
  adding the input number to the listing; and
  returning to inputting when an additional number is to be input.

3. The method of claim 1, wherein providing a listing comprises:
  initiating an access code;

inputting a number to be removed from the listing in response to prompts from the network;
removing the input number from the listing; and
returning to inputting when an additional number is to be input.

4. The method of claim 1, comprising adding a charge to a user account when a predetermined number of calls is received from numbers on the listing.

5. The method of claim 4, wherein administering comprises adding a charge to the user account when the feature has been enabled for a specified time period.

6. The method of claim 4, wherein administering comprises deactivating the feature when no numbers remain in the listing.

7. The method of claim 4, comprising:
initiating an access code;
inputting a number in response to prompts from the network;
adding the input number to the listing when an add number code is provided by the user;
removing the input number from the listing when a remove number code is provided by the user; and
returning to inputting when an additional number is to be input.

8. The method of claim 4, wherein adding a charge comprises adding individual charges for numbers contained in the listing.

9. A system for implementing an on-demand call waiting feature on a network, comprising:
a memory;
a switch receiving an incoming call;
a processor comparing the incoming call to a listing stored in the memory;
a call waiting device to activate a tone when the processor determines a match between the incoming call and the listing; and
means to automatically delete a number associated with the incoming call from the listing when the match is determined.

10. The system of claim 9, comprising a server to obtain data from a user and transmit the data to the memory, the data forming a part of the listing.

11. The system of claim 10, wherein the processor comprises a billing module to charge the user based on a number of calls received from entries in the listing.

12. The system of claim 9, wherein the memory comprises a flag to indicate the presence of a listing in the memory.

13. A computer-readable medium containing instructions for controlling a network system to implement an on-demand call waiting feature, by:
controlling the network to prompt a user of the network to input a number in response to the user inputting an access code;
controlling the network to add the input number to a listing of numbers for which the feature is to be enabled when the access code is an add number code;
controlling the network to remove the input number from the listing when the access code is a remove number code;
controlling the network to return to prompting the user when the input number is not a last input number;
controlling the network to provide a call waiting tone to the user when a call is received from a number on the listing and the user is on a call; and
controlling the network to automatically remove from the listing the number from which the call was received.

14. The computer readable medium of claim 13, containing instructions for controlling the network system to implement the on-demand call waiting feature, by controlling the network to add a charge to the user account when at least one charge criteria is met taken from of a list of charge criteria comprising receiving a predetermined number of calls from numbers on the listing and having the feature implemented for a specified time period.

15. The computer readable medium of claim 14, containing instructions for controlling the network system to implement the on-demand call waiting feature, by controlling the network to deactivate the feature upon removing all the numbers from the listing.

* * * * *